INVENTORS
CHARLES RAVITSKY
DONALD J. MARY

United States Patent Office 3,366,795
Patented Jan. 30, 1968

3,366,795
BACKGROUND DISCRIMINATOR FOR
RADIOMETRIC DEVICES
Charles Ravitsky, Bronx, N.Y., and Donald J. Mary,
Hyattsville, Md., assignors to the United States of
America as represented by the Secretary of the
Army
Filed Sept. 18, 1964, Ser. No. 397,663
5 Claims. (Cl. 250—236)

ABSTRACT OF THE DISCLOSURE

A background discriminator for radiometric devices which eliminates or minimizes the effects of background radiation in a radiometer or radiation detector. The incoming radiation to the detector is modulated by periodically defocusing from the detector or sensing element of the radiometer. This is accomplished by a rotating butterfly mirror for periodically intercepting the radiation and transmitting it to the detector through an alternate path of different length thereby causing the optical system of the device to focus the radiation at a point remote from the detector.

---

Figure 1:
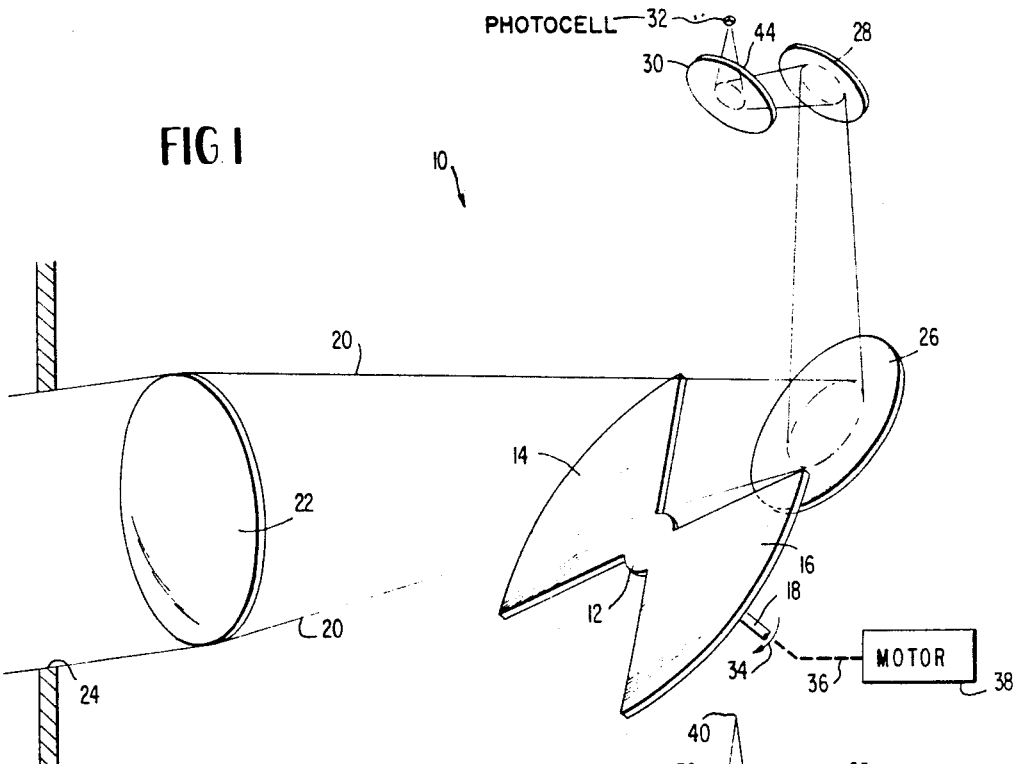

The invention described herein may be manufactured and used for or by the Government of the United States of America for governmental purposes without the payment to us of any royalty thereon.

This invention relates to a background discriminator for radiometric devices and more particularly to a simplified device for eliminating or minimizing the effects of background radiation on a radiometer or radiation detector.

Measurements of the irradiance due to targets having small angular dimensions become increasingly more difficult when the irradiance of the background in the measuring instrument's field of view dominates the target radiation. The most common technique for enhancing the target to background signal ratio is to employ a so-called space filtering reticle. This device is generally arranged to lie in the focal plane of the radiometer collecting optics. The reticle pattern (in its simplest form resembling the spokes of a wheel) is such that, when rotated, the radiation from a source of small angular dimensions is modulated by the opaque spokes in a periodic manner. In contrast, large extended sources in the field of view (such as the background sky) are modulated to a lesser extent or not at all. The more nearly the reticle modulating elements approach the size of the target as seen in the plane of the reticle, the more efficient becomes the background discrimination. This technique only works satisfactorily where there is an appreciable difference in the target's angular dimensions relative to the dimensions of the smallest element comprising the background.

Another desirable feature for a radiometric device is that the electrical bandwidth of the detector circuits should be very narrow. This is particularly necessary when measuring irradiance levels that produce signals near the noise level of the radiometer. However, it is possible to employ space filtering and narrow electrical bandwidth effectively only when observing sources that are stationary in the radiometer's field of view. In measuring the irradiance from moving targets, small tracking errors cause relative (and generally random) motion between the reticle and target image resulting in considerable spread of signal frequencies. As a result, the bandwidth of the electrical measuring equipment must be correspondingly high.

The present invention avoids the above-mentioned difficulties by providing a device which greatly attenuates the problem of signal frequency variation in radiometric observations of moving sources and is particularly suited for the detection of small radiation targets in the presence of substantial background radiation. For example, the background discriminator of this invention is particularly suited for use in measuring or sensing the heat or infrared radiation from the engine of a jet aircraft during flight. While the device will be so described, it is not limited to such usage but may be incorporated for use in weather detection apparatus, radiosondes, and for general use in absorption spectrometry. Likewise, while described in conjunction with the detection of infra-red radiation the discriminator finds use for all types of radiation including both ultraviolet and visible light.

In contrast with the above-mentioned reticle type discriminator, the device of the present invention modulates the incoming radiation by periodically defocusing from the sensing element or detector of the radiometer. To accomplish this result, the device provides a rotating butterfly mirror for periodically intercepting the radiation and transmitting it to the detector through an alternate path of different length thereby causing the optical system of the device to focus the radiation at a point remote from the detector.

The device of the present invention is not only of relatively simplified and reliable construction, but presents a constant modulation frequency regardless of target motion within the field of view. It permits use of a narrow bandwidth in the detector amplifier, thereby improving the signal to noise ratio. In addition, the unit provides substantial ease of fabrication when compared with a reticle type modulation device.

It is therefore one object of the present invention to provide a novel radiation background discriminator.

Another object of the present invention is to provide a radiation background discriminator particularly suited for use in conjunction with the detection of radiation from moving targets.

Another object of the present invention is to provide a background discriminator for radiometers permitting the use of narrow bandwidth detector amplifiers.

Another object of the present invention is to provide a radiation detector incorporating a background discriminator of more simplified and inexpensive construction.

Figure 2:
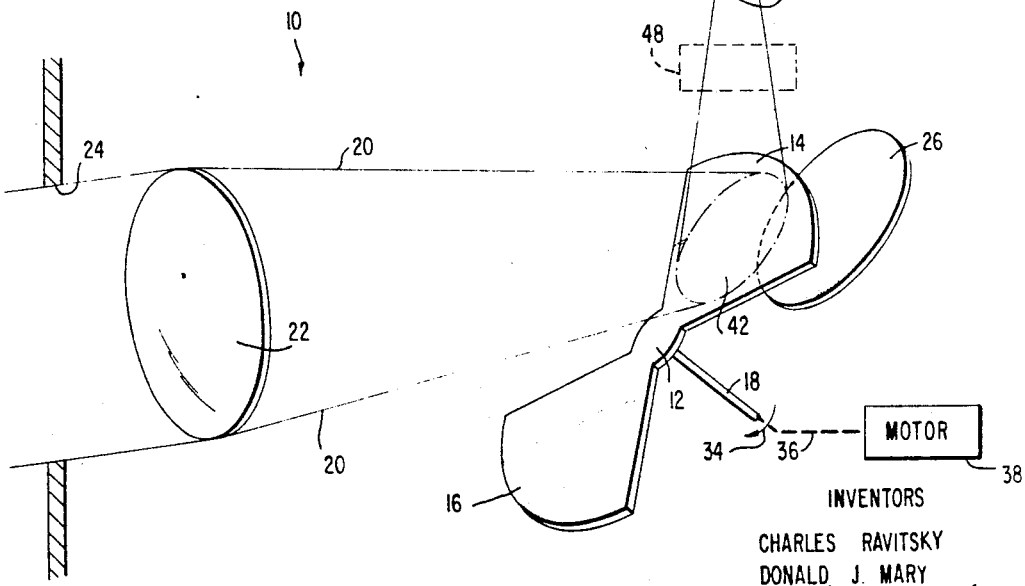

These and further objects and advantages of the invention will be more apparent upon reference to the following specification, claims, and appended drawings wherein:

FIGURE 1 is a diagrammatic view showing the novel background discriminator of the present invention, and FIGURE 2 is a view similar to FIGURE 1 illustrating the incoming radiation intercepted by the rotating mirror of the discriminator.

Referring to the drawings, the novel background discriminator of the present invention generally indicated at 10 comprises a rotatable butterfly mirror 12 provided with a pair of reflective vanes 14 and 16 spaced symmetrically about a rotatable shaft 18 on which the mirror is mounted. As illustrated in the drawing, radiation as represented by the infra-red rays indicated by the ray lines 20, passes between the segments 14 and 16 of the mirror from the focusing lens 22 of the collecting optical system. The radiation impinges on the lens 22 from a suitable collecting aperture stop 24.

After passing by the mirror 14 the radiation impinges on a pair of full reflecting mirrors 26 and 28 and from these passes to a half silvered mirror 30 where half of it is reflected and focused on the sensing element or detector 32 of a radiometer. The butterfly mirror 12 may be rotated in either direction but is illustrated as rotated in the direction indicated by the arrow 34 in FIGURE 1.

The shaft 18 is mechanically coupled as indicated by the dashed lines 36 to a suitable drive motor 38.

Referring to FIGURE 2, the butterfly mirror 12 has rotated through 90° from the position of FIGURE 1 such that the reflective vane 14 intercepts the rays of radiation 20 and directs them through half silvered mirror 30 to a new focal point 40 remote from and beyond the detector 32. The light in impinging upon mirror 12 as indicated at 42 is intercepted by the mirror and does not pass to the two full reflecting mirrors 26 and 28.

The half silvered mirror 30 is of conventional construction in that light impinging on its upper surface 44 and also upon its lower or back surface 46 is partially transmitted and partially reflected. That is, half of the radiation passes through the mirror without substantial attenuation while the other half of the radiation is reflected by the mirror.

In the present invention instead of attempting to modulate the radiation by using alternate opaque and transparent reticle blades the device focuses and defocuses the radiometer in a cyclic manner. During one-half of the modulating cycle, the radiation being focused by the collecting optics including lens 22 is reflected by the mirrors 26, 28 and 30 as in FIGURE 1 on to the detector 32. The spacing and arrangement of the optical elements is such that during this portion of the modulation cycle the source is focused on the detector.

During the next half of the modulation cycle determined by the speed of motor 38 and as illustrated in FIGURE 2, the reflecting vane 14 of the butterfly mirror 12 has rotated into a position to intercept the radiation. The radiation is therefore reflected by the butterfly mirror through the transparent mirror 30 and past the detector to be focused at point 40. The portion of the target radiation falling on the detector is considerably less than in the previous half cycle, hence the signal from the detector is greatly reduced. This periodic focus-defocus action modulates the source radiation.

A uniform background, however, produces a larger signal in the defocused position because the detector is closer to the collecting aperture 24 thereby increasing the field of view of the instrument. An adjustable diaphragm indicated by dashed lines at 48 in FIGURE 2 may be provided if desired between the mirrors 12 and 30. This adjustable diaphragm may be set to completely balance out the modulation of the background. The amount of vignetting required by the diaphragm 48 is dependent only on the radiometer geometry and not on the background radiation.

It is apparent from the above that the present invention provides a novel background discriminator for use with radiometers of relatively easy fabrication and simplified construction as compared to prior known devices. The unit provides a constant modulation frequency determined only by the driving motor 38 and makes possible the use of a narrow bandwith amplifier in the detector, with the accompanying reduction in the signal-to-noise ratio.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A radiation background discriminator comprising a collecting aperture, a radiation detector, a mirror system for directing radiation passing through said aperture onto siad detector through two separate paths of different length, a lens for focusing said radiation on said detector when it passes through one of said paths, and means for periodically alternating said paths.

2. A discriminator according to claim 1 wherein said mirror system includes a half silvered mirror, and means for alternately directing said radiation to opposite sides of said mirror.

3. A radiation background discriminator comprising an aperture, a radiation detector, a mirror system for directing radiation passing through said aperture onto said detector through two separate paths of different lengths, and lens means for focusing said radiation on said detector when it passes through one of said paths, said mirror system comprising a member reflective to radiation impinging on one surface and transparent to radiation impinging on another surface, means including a rotatable mirror having spaced reflective vanes for alternately directing said radiation onto said reflective and transparent surfaces of said element, and drive means coupled to said rotatable mirror.

4. A discriminator according to claim 3 wherein said detector is an infra-red detector.

5. A discriminator according to claim 3 including an adjustable diaphragm positioned between said rotating mirror and said element.

References Cited
UNITED STATES PATENTS

| | | |
|---|---|---|
| 2,838,600 | 6/1958 | Salinger. |
| 3,001,437 | 9/1961 | Taylor _____ 250—203 X |
| 3,035,176 | 5/1962 | Kis et al. _____ 250—210 |
| 3,041,459 | 6/1962 | Greene. |
| 3,073,957 | 1/1963 | Jones _____ 250—233 X |
| 3,178,992 | 4/1965 | Murphy et al. _____ 250—233 X |

RALPH G. NILSON, *Primary Examiner*

WALTER STOLWEIN, *Examiner.*

M. LEAVITT, *Assistant Examiner.*